July 19, 1960 E. W. BECHTOLD ET AL 2,945,419
VARIABLE FOCAL LENGTH LENS SYSTEM FOR MOVIE CAMERAS
Filed Dec. 6, 1955 6 Sheets-Sheet 3
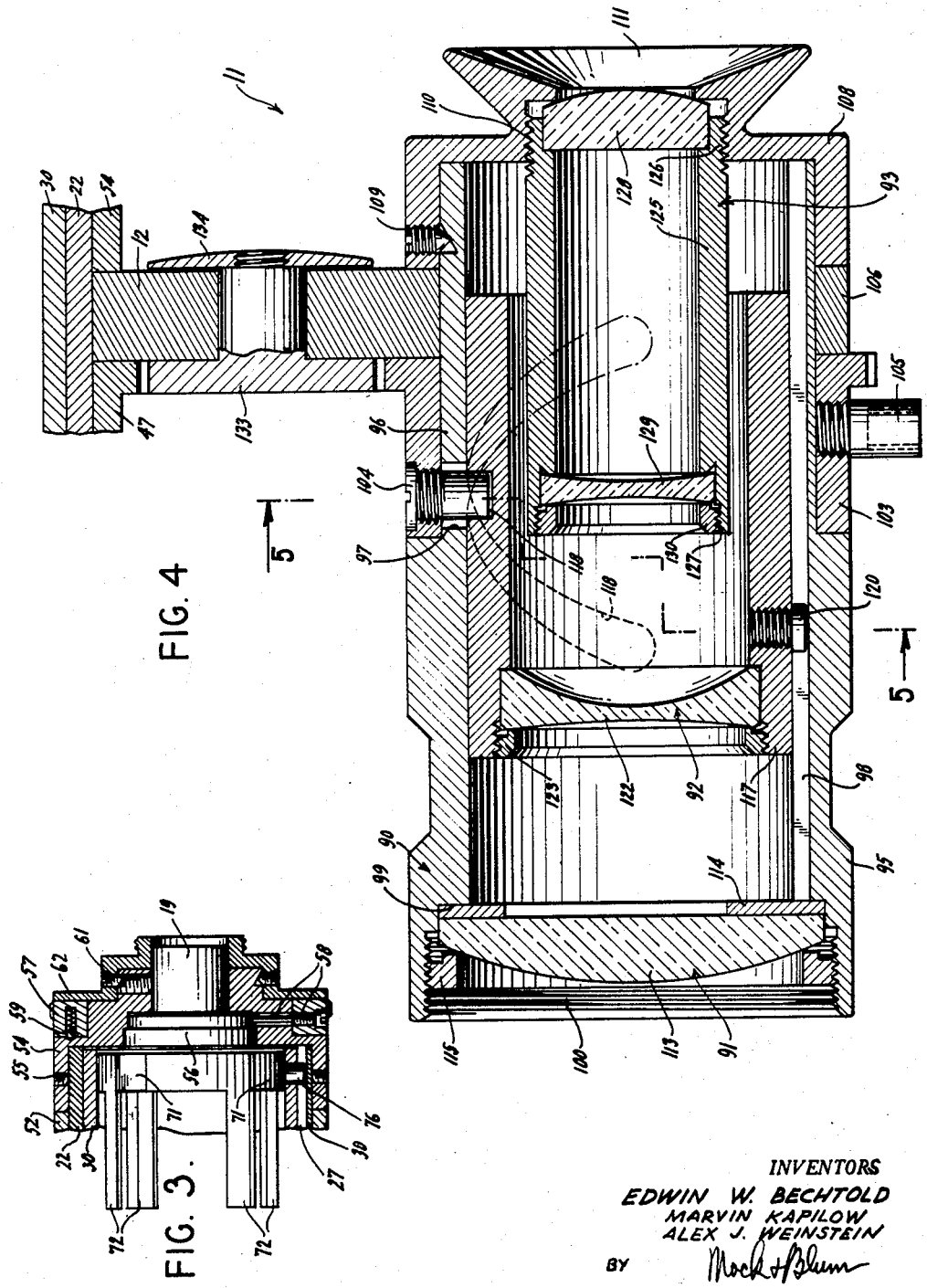
INVENTORS
EDWIN W. BECHTOLD
MARVIN KAPILOW
ALEX J. WEINSTEIN
BY
ATTORNEYS

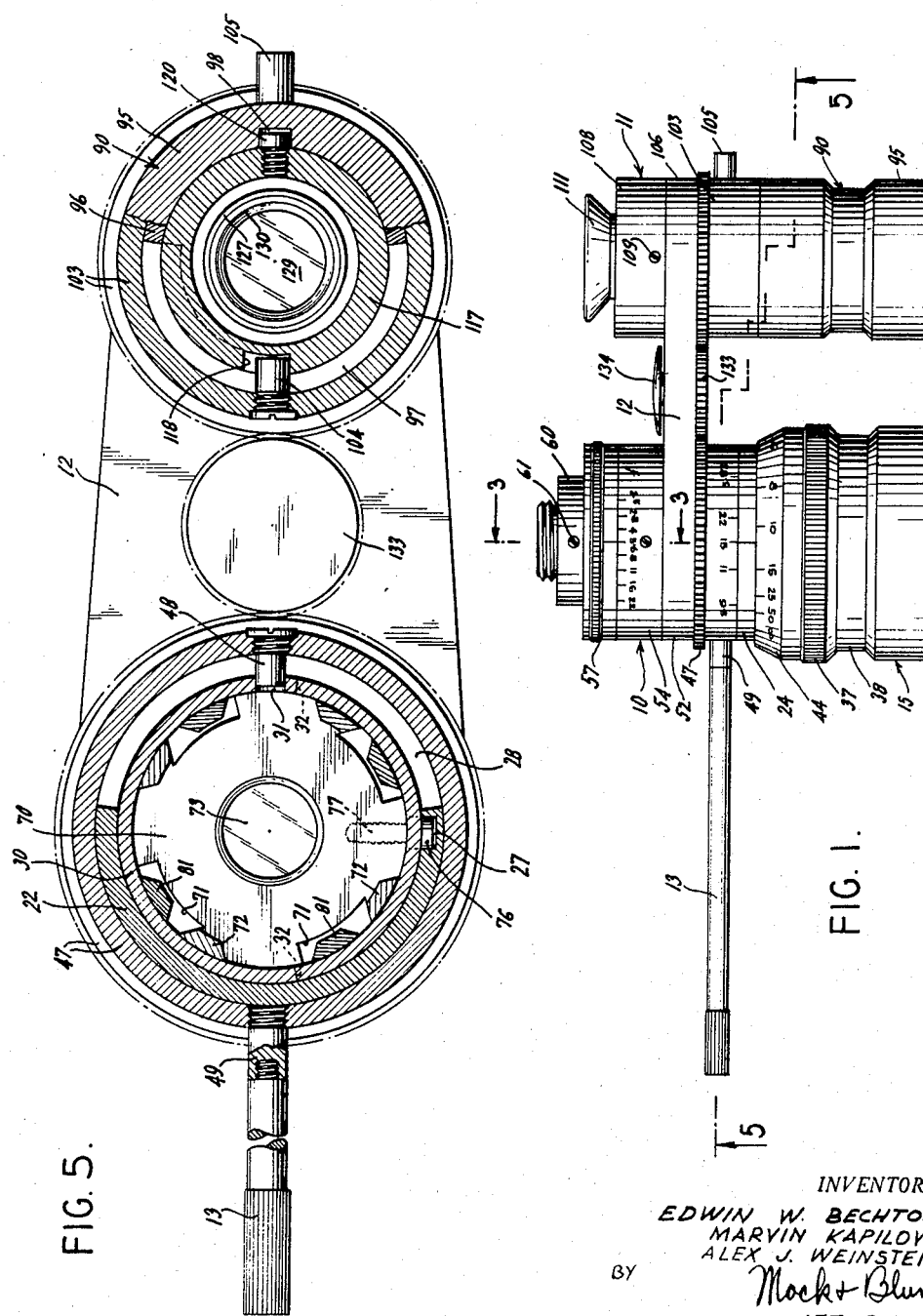

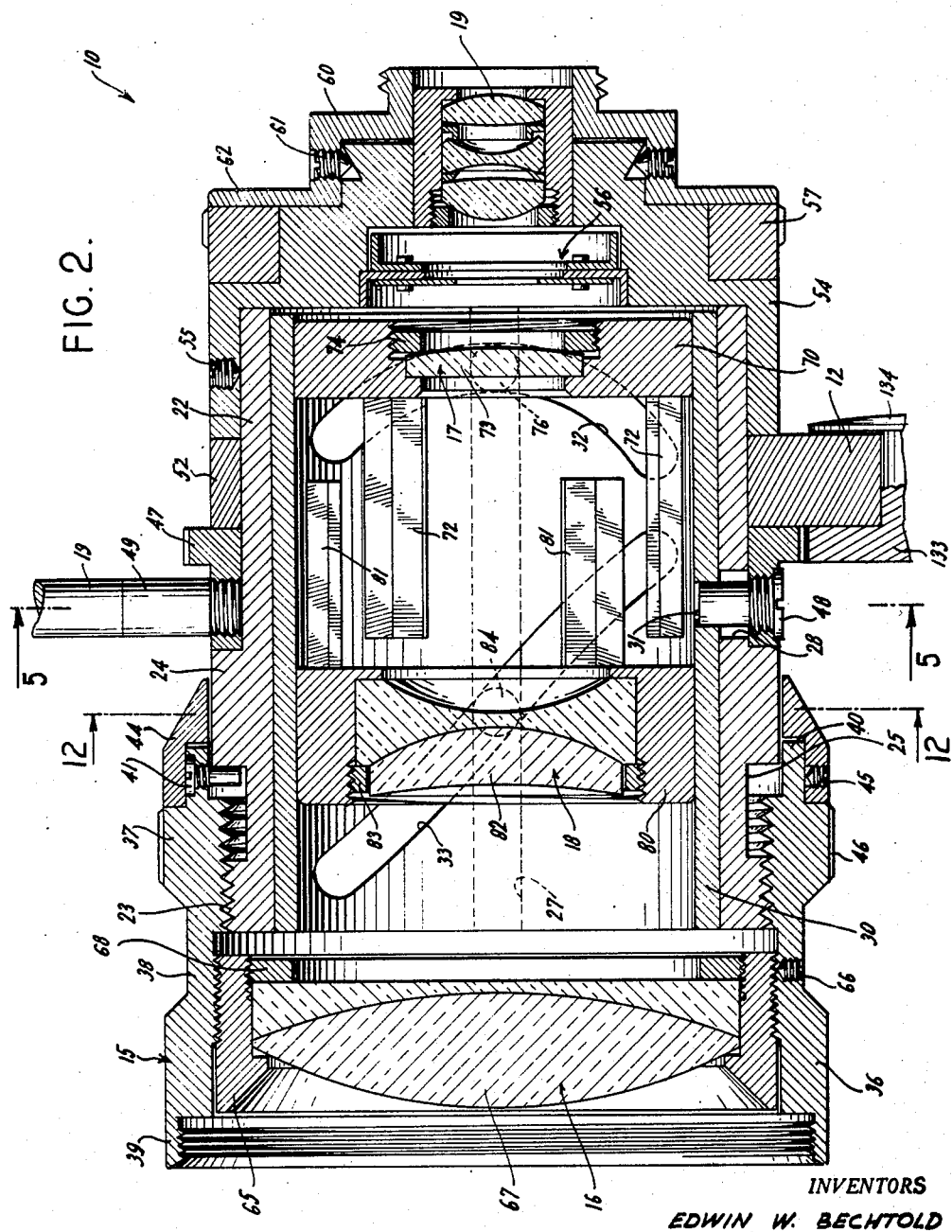

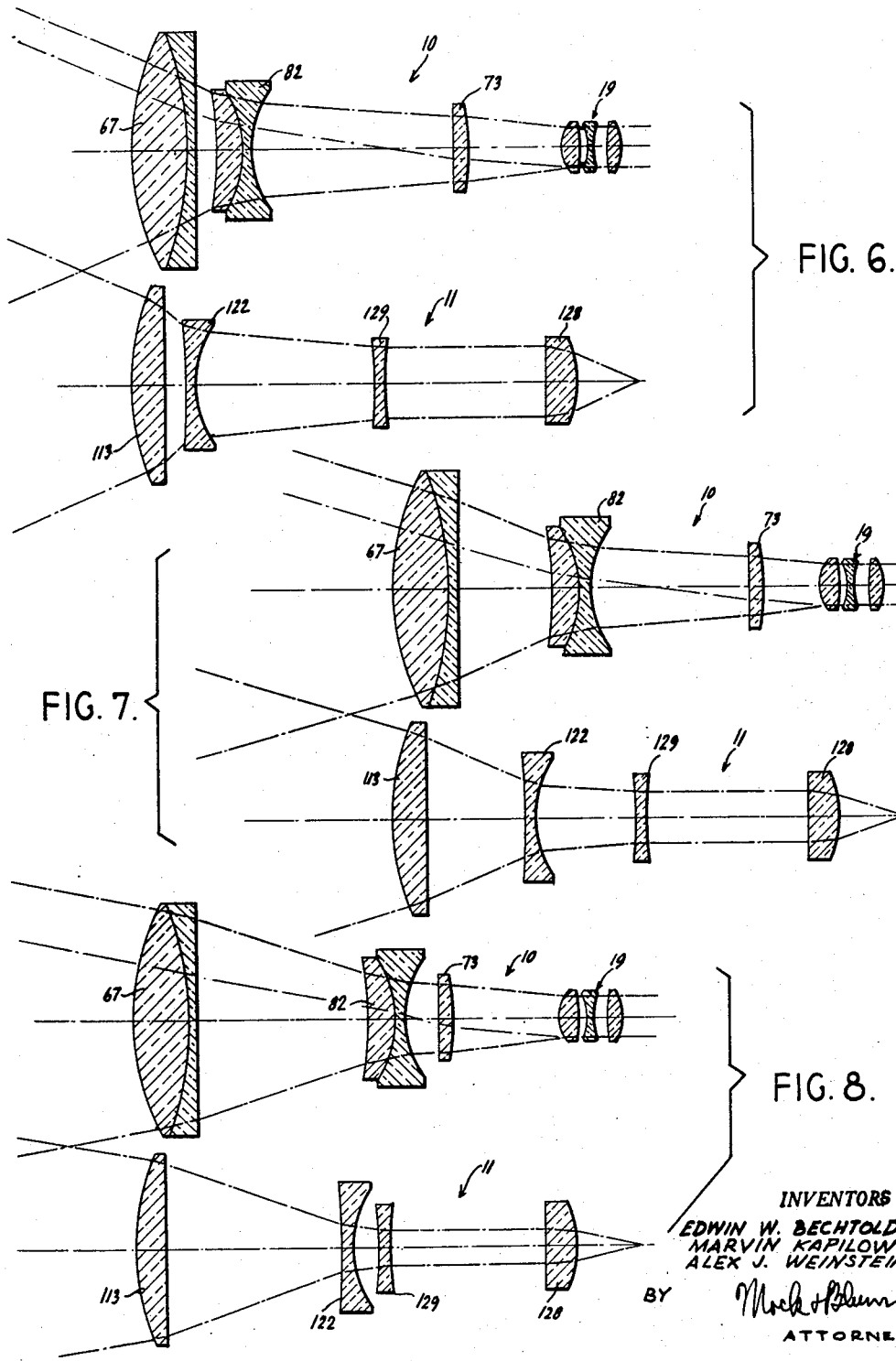

July 19, 1960 E. W. BECHTOLD ET AL 2,945,419
VARIABLE FOCAL LENGTH LENS SYSTEM FOR MOVIE CAMERAS
Filed Dec. 6, 1955 6 Sheets-Sheet 5
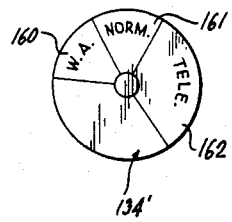
FIG. 9. FIG. 10.
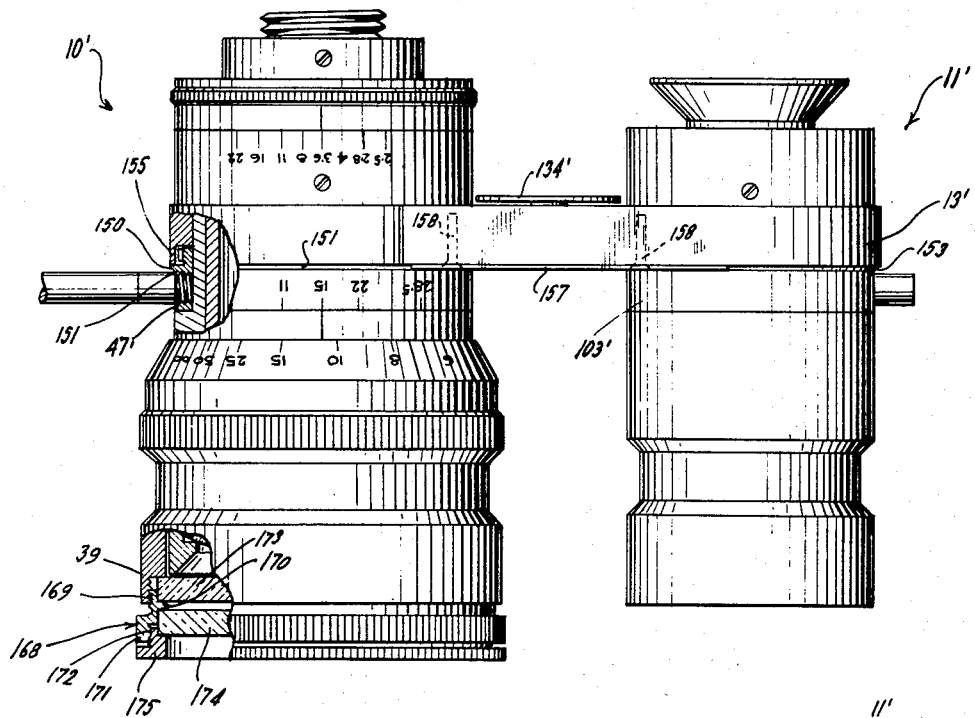
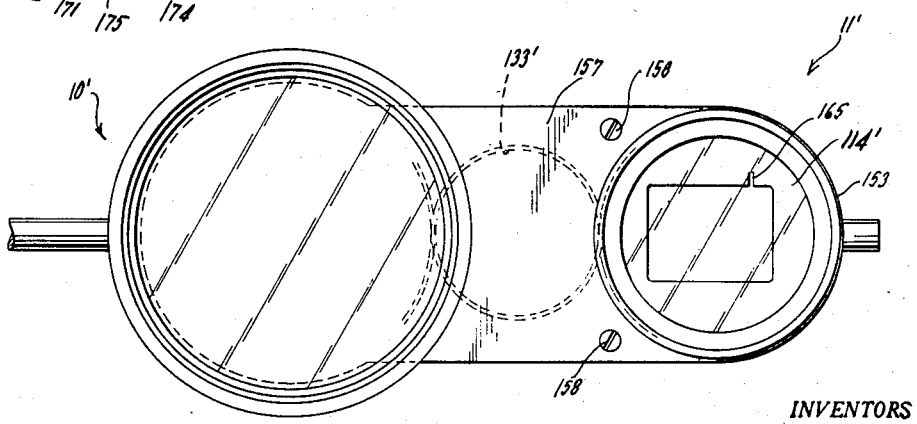
FIG. 11.
INVENTORS
EDWIN W. BECHTOLD
MARVIN KAPILOW
ALEX J. WEINSTEIN
BY
ATTORNEYS

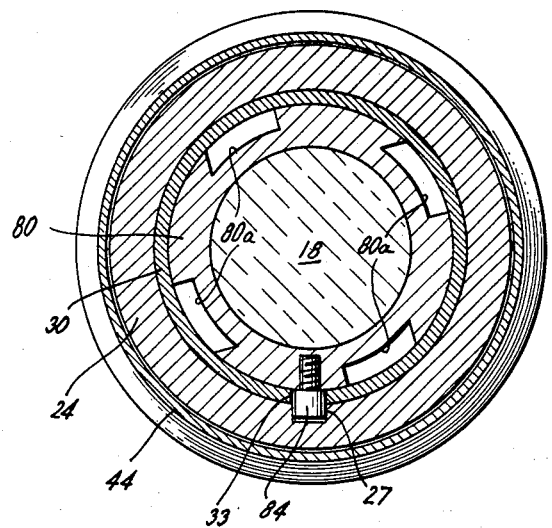
FIG_12.

United States Patent Office 2,945,419
Patented July 19, 1960

2,945,419

VARIABLE FOCAL LENGTH LENS SYSTEM FOR MOVIE CAMERAS

Edwin W. Bechtold, Middle Village, Marvin Kapilow, Peekskill, and Alex J. Weinstein, Mount Vernon, N.Y., assignors to The Ednalite Optical Company, Inc., Peekskill, N.Y., a corporation of New York Filed Dec. 6, 1955, Ser. No. 551,302

3 Claims. (Cl. 88—57)

This invention relates generally to lens systems for cameras, and is particularly directed to a variable effective focal length lens system for movie cameras which produces the zoom effect of camera movement toward and away from the object, without movement of the camera.

While there are devices in the prior art for producing the zoom effect by varying magnification of the image or equivalent focal length, such devices are subject to numerous inherent difficulties which have precluded their widespread acceptance. By way of example, prior zoom effect lens systems required complex and delicate mechanisms for moving the component lenses relative to each other. Further, a multiplicity of optical components or lenses were involved, and these lenses were relatively expensive as being necessarily corrected for all positions of movement. For these and other reasons, previous zoom effect lens systems were extremely costly to produce, unreliable in operation, and readily susceptible to excessive wear which impaired the quality of image and reduced the range of magnification.

It is therefore a general object of the present invention to provide a zoom effect lens system which overcomes the abovementioned disadvantages, produces excellent quality images over a wide range of magnification with any camera, employs a highly simplified optical system requiring a minimum of lenses, and which is extremely simple and inexpensive in construction, and accurate and reliable in use.

It is another object of the present invention to provide a manually actuable variable focal or zoom lens which produces a linear rate of change in magnification in response to a linear hand motion for natural-appearing zoom effects.

It is another object of the present invention to provide an optical construction having relatively movable lenses, wherein novel means are included to insure free lens movement and effectively reduce wear on moving parts. More particularly, a feature of the present invention prevents wedging, canting or cocking of a lens mount in a barrel or tube; and, in addition, permits relative movement of two or more lens mounts into and out of close proximity with each other.

It is another object of the present invention to provide a plurality of separate and distinct lens systems each having relatively movable lenses, and including novel means serving to move the lenses of the several systems in predetermined relation with respect to each other.

It is a further object of the present invention to provide an improved viewfinder for use with zoom effect lens systems, which viewfinder is simple and rugged in construction, and automatically cooperates with its associated zoom lens to produce an image corresponding in magnification to that of the zoom lens at all times.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is a plan view showing an accessory zoom lens and viewfinder constructed in accordance with the present invention;

Fig. 2 is an enlarged, generally horizontal sectional view taken through the zoom lens of Fig. 1, with the parts thereof in an intermediate or normal position;

Fig. 3 is a partial, vertical sectional view taken substantially along the line 3—3 of Fig. 1;

Fig. 4 is an enlarged, generally horizontal sectional view taken through the viewfinder of Fig. 1, with the parts in a normal or intermediate position corresponding to that of Fig. 2;

Fig. 5 is a transverse sectional view taken generally along the line 5—5 of Fig. 1 or Fig. 2;

Fig. 6 is an optical ray diagram schematically illustrating the optical systems of the instant zoom lens and viewfinder in their extreme wide angle positions of minimum effective focal length and fractional magnification, without attempted accuracy of geometry or lens shapes;

Fig. 7 is a ray diagram similar to Fig. 6, but showing the optical components in an intermediate or normal position of unit magnification with no enlargement or reduction of image size;

Fig. 8 is an optical ray diagram similar to Figs. 6 and 7, but showing the lens systems in their extreme telephoto positions of maximum magnification and effective focal length;

Fig. 9 is a plan view showing a slightly modified form of accessory zoom lens and viewfinder of the present invention, with parts broken away for clarity of understanding;

Fig. 10 is an elevational view showing a range indicator of the instant invention, removed from the assembly;

Fig. 11 is a front elevational view of the embodiment of Fig. 9; and

Fig. 12 is a transverse sectional view taken substantially along the line 12—12 of Fig. 2.

Referring now more particularly to the drawings, and specifically to Fig. 1 thereof, the embodiment of the invention illustrated therein comprises a zoom effect accessory lens, generally designated 10, a viewfinder, generally designated 11, which is arranged longitudinally alongside of and fixedly secured to the accessory lens transversely extending bracket 12. An operating arm lever or handle projects transversely from the lens 10 for manually actuating the lens and viewfinder.

In Fig. 2 the zoom lens 10 is seen in greater detail, and includes a generally tubular barrel 15, a converging front lens or lens unit 16 mounted forwards in the barrel, and an intermediate, diverging lens or lens unit 18 mounted in the barrel between the front and rear lenses. Also illustrated as mounted in the barrel 15, rearwards of the rear lens 17, is an additional lens unit or assembly 19. However, the lens assembly 19 functions only as a conventional camera objective lens; and, while it is preferred to replace the camera objective with the entire accessory lens 10 of Fig. 2 to obtain zoom effects, it is appreciated that the lens assembly 19 could be omitted and the camera objective substituted in place of the latter assembly.

A tubular, open ended outer shell or body 22 constitutes one element of the barrel 15. The outer shell or body 22 is of generally cylindrical configuration, and is provided at its forward end with an external, peripheral enlargement 23 having external screw threads formed thereon. Spaced between the externally threaded enlargement 23 and the rear end of the outer shell 22 is a circumferentially extending, external shoulder or collar 24. It will be noted that the peripheral enlargement 23 and collar 24 combine with the external surface of the outer shell 22 to define a circumferentially extending external groove or recess 25.

Formed internally of the outer shell or body 22 is a longitudinally extending, inwardly opening recess guideway or groove 27. The groove 27 is generally straight, as shown in dashed lines in Fig. 2, and may have its opposite ends opening through opposite ends of the outer shell. Just rearwards of the external shoulder or collar 24, the outer shell or body 22 is formed with a through slot 28 extending circumferentially approximately 160° about the shell. In Fig. 5 it will be observed that the slot or opening 28 terminates at one end just short of the groove 27.

Arranged longitudinally of and slidably within the outer shell or body 22 is an open ended, generally cylindrical barrel liner or inner tube 30. Formed in the liner wall, in substantial alignment with the slot 28 of the outer shell 22, is an opening or bore 31, and in the rearward portion of the cylindrical inner liner is a generally arcuate or curvilinear closed end slot 32. The slot 32 extends approximately 139° about the circumference of the inner liner, and has its intermediate region disposed rearwards of its end regions. Forwards of the arcuate slot 32, the inner liner 30 is formed with a generally helical, closed end slot 33. More specifically, the slot 33 extends helically, approximately 139° about the axis of the liner 30, and has its opposite ends respectively in substantial alignment with the ends of the slot 32, longitudinally of the liner. Stated otherwise, the closed end slots 32 and 33 are substantially coextensive with each other circumferentially of the liner 30.

Secured on the forward end of the barrel shell 22 is an open ended barrel element or focusing tube 36, which has its rearward portion 37 internally threaded for engagement with the externally threaded enlargement 23 of the barrel shell. Further, the focusing tube 36 has its intermediate portion 38 internally threaded for adjustably receiving the lens unit 16, and also has its forward end portion 39 internally threaded for releasably securing a dust cap (not shown) in closing relation over the forward barrel end. Projecting rearwards from the focusing tube 36 and extending circumferentially about the barrel shell 22, is an annular lip or skirt 40. A stop member or pin 41 extends radially inwards through the skirt 40, being threadedly secured in the latter, and extends into the external groove or recess 25 of the barrel shell 22. The pin 41 is thus movable with the focusing tube 36 longitudinally of the barrel 15, and engageable with the machined sides or side walls of the groove 25 to accurately limit rearward and forward movement of the focusing tube relative to the shell or body 22. Focusing tube adjustment is thus permitted over a relatively wide range, considerably greater than that possible within 360° rotation of the tube.

Circumposed about the lip 40 and extending rearwards therefrom is a calibrated annular ring or scale 44 which is adjustably fixed to the lip by a set screw 45 or other suitable means. The rearward portion 37 of the focusing tube 36 may be externally knurled as at 46, to facilitate its manual rotation; and the ring 44 is preferably calibrated in object distances, and selectively positionable with respect to a mark on the barrel shell 22, as seen in Fig. 1.

Rotatably circumposed about the barrel shell 22, overlying the slot 28, is an externally toothed drive ring or gear 47. A drive pin or peg 48 is threadedly engaged inwards through the ring 47, and extends spacedly through the barrel shell slot 28, having its inner end snugly received in the liner bore 31. The liner 30 and drive ring 47 are thereby fixedly connected together for simultaneous axial rotation relative to the barrel shell 22 and within the limits defined by the slot 28. Opposite to the pin 48, the arm or handle 13 has one end removably secured in threaded engagement within a boss or lug 49, which is in turn threadedly secured in the drive gear 47.

Fixedly clamped about, or otherwise secured to the barrel shell 22, just rearwards of the rotatable drive gear 47, is one end portion 52 of the bracket 12. An end cap 54 is engaged over the rear end of the barrel shell 22 and fixedly positioned on the latter by one or more set screws 55. The end cap 54 carries the optional camera objective lens unit 19, and also preferably carries a variable iris or aperture mechanism, diagrammatically presented at 56. Rotatably circumposed about the end cap 54 is an externally knurled, iris actuating ring 57, best seen in Fig. 3. A drive pin 58 extends inwards from the iris actuating ring 57, through the end cap 54, and is operatively connected to the iris mechanism 56 to vary the aperture upon rotation of the iris ring. In the conventional manner, a spring pressed detent ball 59 may be mounted in the iris ring 57 and engageable with the end cap 54 to releasably retain the iris ring in any selected position of its rotation.

Detachably fixed on the rearward end of the end cap 54 is an externally threaded mounting ring 60 adapted for threaded engagement in a camera lens opening. More particularly, the mounting ring 60 is circumposed about the rearward portion of the end cap 54 and firmly retained on the end cap by a plurality of set screws 61 engaging in angular recesses of the end cap. A radial flange 62 on the mounting ring 60 retains the iris actuating ring 57 in position on the end cap.

The converging front lines unit 16 includes an annular amount or ring 65 externally threaded for engagement with the internal screw threads of the intermediate focusing tube portion 38. Thus, the mounting ring 65 is axially adjustable in the focusing tube 36 and may be fixed at the proper position of adjustment by one or more set screws 66 extending inwards through the focusing tube. The lens proper 67 of the lens unit 16 is of plus or positive power, commonly called a converging lens, and may be composed of more than one lens element to obtain the desired correction. An externally threaded lock nut or retaining ring 68 secures the lens 67 in its mount 65.

The rear converging lens unit 17 includes a lens mounting annulus or ring 70 slidably received in the rearward portion of the barrel liner 30; and, the mounting ring is provided about its circumference with a plurality of peripheral openings or notches 71, see Fig. 5. Four such openings are shown for purposes of illustration. A plurality of circumferentially spaced, elongate tongues or slide bars 72 project forwards from the mounting ring 70, longitudinally of the liner 30, and in slidable engagement with the interior surface of the latter. In Fig. 5 it will be noted that four tongues or slide bars 72 are disposed respectively adjacent to and offset from the ring notches 71. However, it is appreciated that more or less tongues 72 may be employed, as desired, and that their number need not correspond to the number of notches.

As the tongues 72 slidably engage with the internal surface of the liner 30, they reduce the unit bearing pressure of the mounting ring 70 on the barrel liner, thereby minimizing wear of the bearing surfaces. Further the longitudinal or axial extension of the slide bars 72 serves to increase the effective axial dimension of the mounting ring 70 and thus prevent canting or tilting of the latter. That is, canting of the mounting ring 70 is prevented, so that the ring cannot wedge or cock in the liner and jam or score the moving parts.

The lens proper 73 of the rear lens unit 17 is also a plus or converging lens, and is secured in the ring 70 by an externally threaded retaining ring or lock nut 74. Projecting radially outwards from the mounting ring 70 is a cam follower, pin or lug 76, best seen in Fig. 5, which extends through the barrel liner slot 32 and into the groove 27 of the barrel shell. In practice, the cam follower 76 may advantageously consist of a headed screw or fastener 77 extending radially into the mounting ring 70.

It will now be understood that axial rotation of the barrel liner 30, as effected by rotation of the drive ring 47, will shift the pin 76 longitudinally of the barrel 15 along the barrel shell groove 27 as determined by the curvature of the slot 32. That is, the pin 76 is confined in both the groove 27 and slot 32, and is thereby constrained to movement longitudinally of the barrel, always being positioned at the intersection of the latter groove and slot. The bounding edge of the slot 32 thus defines a cam surface engaging the pin 76 to shift the lens unit 17 longitudinally within the barrel liner 30. As noted hereinbefore, the tongues 72 insure free sliding movement of the lens unit 17 in the barrel liner, with a minimum of wear.

The intermediate lens unit 18 includes a lens mounting annulus or ring 80 disposed axially and slidably within the forward region of the barrel liner 30. Formed in the periphery of the mounting ring 80 are a plurality of circumferentially spaced notches or openings 80a, which may be identical to the notches 71 of the mounting ring 70, and are best seen in Fig. 12. It is essential, however, that the notches 80a of the mounting ring 80 be in alignment, respectively, longitudinally of the barrel 15 with the tongues or slide bars 72 and of sufficient size to receive the latter, for purposes appearing presently.

A plurality of longitudinally extending tongues or slide bars 81 project rearwards from the lens mounting ring 80 toward the lens mounting ring 70 in Fig. 2. The slide bars 81 are disposed in parallelism with each other, circumferentially spaced about the mounting ring 80, and each in slidable engagement with the interior surface of the barrel liner 30. In Fig. 5 it will be observed that each of the slide bars 81 is in longitudinal alignment with a respective one of the notches 71 of the mounting ring 70, and of a cross sectional size to be received in its respective notch upon sliding movement of the mounting rings 70 and 80 toward each other. That is, the slide bars 81 are circumferentially offset from the slide bars 72 so as to be in alignment with the notches 71 of the mounting ring 70, and similarly, the peripheral notches of the mounting ring 80 (not shown) are circumferentially offset from the guide bars 81 of the latter mounting ring so as to be in alignment with the slide bars 72 for receiving the latter upon movement of the mounting rings 70 and 80 toward each other. By this construction, the mounting rings 70 and 80 may be moved into and out of close proximity with each other.

The guide bars 81 slidably engage the interior surface of the barrel liner 30 and function in substantially the same manner as the guide bars 72, namely, to reduce unit bearing pressure and wear, and to prevent canting or wedging of the mounting ring 80 in the barrel liner.

The lens proper 82 of the lens unit 18 is of negative or minus power, commonly called a diverging lens, and may be formed of a plurality of cemented lens elements, as required for the desired correction. For reasons appearing hereinafter in greater detail, the negative strength or power of the diverging, intermediate lens 82 is greater than the positive strength or power of either the front converging lens 67 or the rear converging lens 73. An externally threaded lock nut or retaining ring 83 is engaged interiorly of the mounting ring 80 to secure the lens 82 in the latter mounting ring.

Projecting radially outwards from the periphery of the lens mounting ring 80 is a cam follower lug or pin 84, shown in dashed outline in Fig. 2, and which may in practice constitute the head of a threaded fastener such as was described in connection with the cam follower 76. The cam follower 84 extends radially outwards through the helical barrel liner slot 33, being slidable therein, and is slidably received in the longitudinal barrel shell groove 27. The cam follower 84 is thus confined to movement within the slot 33 and groove 27. As the groove 27 is fixed relative to barrel 15, the cam follower and hence the lens unit 18 is constrained to longitudinal or axial movement relative to the barrel, while the inclination or helix angle of the slot 33 determines the rate of axial movement of the lens unit for a given rate of barrel liner rotation and constrains the diverging lens unit to a predetermined position of axial movement for each position of barrel liner rotation. Hence, the bounding edge of the liner slot 33 defines a cam surface which constrains the diverging lens unit to a predetermined axial motion. As the liner cam slot 33 is preferably a true spiral or helix, axial movement of the diverging lens unit 18 will be directly proportional to, or a liner function of rotative movement of the barrel liner 30 and drive ring 47.

It will now be understood that clockwise rotation of the operating lever or arm 13, as viewed in Fig. 5, will axially shift the lens units 18 and 17 to their extreme position of movement toward each other. This may be appreciated by visualizing the cam slots 32 and 33 to move upwards, as seen in Fig. 2, thereby causing the cam follower 76 and its lens unit 17 to shift leftwards and causing the cam follower 84 and its lens unit 18 to shift rightwards. The illustrated position of Fig. 2 is a normal or intermediate position of unit magnification. Upon counter clockwise lever arm rotation, as seen in Fig. 5, both the intermediate or diverging lens unit 18 and the rear converging lens unit 17 are shifted forward, or leftward as seen in Fig. 2 to their extreme position of movement away from each other.

The construction of the viewfinder 11 is best seen in Fig. 4 as composed essentially of an open ended tubular barrel, generally designated 90, which is disposed longitudinally alongside of the zoom lens 10 and fixedly connected to the latter by the bracket 12. Axially mounted interiorly of the viewfinder barrel 90 are a front, converging viewfinder lens unit 91, an intermediate diverging view finder lens unit 92, and a rear viewfinder lens unit or eyepiece lens assembly 93.

The viewfinder barrel 11 includes an open ended, tubular outer shell or body 95 of generally cylindrical configuration and having its rearward portion 96 of reduced external diameter. Spaced from the rear end of the viewfinder barrel shell 95, its reduced rearward portion 96 is formed with a through slot 97 extending circumferentially about the shell approximately 180°. Generally opposite to the central region of the circumferential slot 97, the barrel shell 95 is formed on its inner surface with a straight, longitudinally extending open ended groove or guideway 98. The forward portion of the shell 95 is interiorly enlarged, terminating in a forwardly facing shoulder 99 and provided with internal screw threads 100.

Rotatably circumposed about the reduced rearward shell portion 96, overlying the circumferentially extending slot or opening 97 is an externally toothed drive ring or gear 103. Extending radially inwards from the drive ring 103, through and beyond the slot 97 is a drive pin 104. This drive pin may be threadedly secured in the drive ring 103 and have its inner end extend spacedly through and inwards beyond the slot 97, for rotation with the drive ring within the limits of the slot.

Diametrically opposite to the drive pin 104, an internally threaded boss 105 is threaded or otherwise secured in the drive ring 103 and projects radially outwards therefrom. The boss 105 is adapted to optionally receive the operating lever 13, as for a left-handed operator or otherwise when convenience requires.

An end portion or loop 106 of the bracket 12 is clamped about or otherwise fixedly secured to the barrel shell 95 just rearwards of the rotatable drive ring 103.

The viewfinder barrel includes a cap-like rear end piece 108 engaged over the rear end of the barrel shell 95 and secured in position by one or more set screws 109. In particular, the barrel end piece 108 is of generally annular configuration, formed with internal screw threads 110 and provided with a rearwardly facing, eye engaging portion 111.

The front converging lens unit 95 of the viewfinder 11 includes a front converging lens 113, and a field of view window or mask 114, which are together clamped in position against the forwardly facing shell shoulder 99 by an externally threaded lock nut or retaining ring 115. The opening in mask 114 is offset from center, as seen in Fig. 4, to compensate for parallax.

The intermediate viewfinder lens unit 92 includes a tubular lens mount arranged longitudinally within the barrel shell 95 and slidable forwards and rearwards in the latter. The external surface of the tubular lens mount 117 is formed with a generally helical, outwardly opening guideway or groove 118, which is shown in dot-and-dash outline extending forwards from the paper, and in dashed outline extending rearwards into the paper. The inner end of the pin 104 is slidably received within the groove or opening 118. Projecting radially from the lens mounting tube 117 into the internal groove or guideway 98 of the shell 95, is a lug or pin 120. The lug 120 is slidably received in the longitudinal groove 98, and may, as illustrated, constitute the enlarged end or head of a screw or fastener threadedly secured in the mounting tube 117.

The lens proper 122 of the intermediate lens unit 92 is of minus or negative power, commonly called diverging, and is of greater minus power or strength than the positive or plus strength of the front converging lens 113. It will be observed that the diverging lens 122 is secured in the forward region of the lens mounting tube 117 by an externally threaded lock nut or retaining ring 123 threadedly engaged in the mounting tube.

Upon rotation of the drive ring or gear 103, the drive pin 104 will rotate circumferentially of the shell 95 in the slot 118 and tend to cause rotation of the lens mounting tube 117 by engagement of the drive pin in the helical groove 118. However, the lug 120 is slidable in the longitudinal guideway or groove 98 to constrain the lens mounting tube 117 to longitudinal shifting movement in the barrel shell 95. Rotation of the drive ring 103 therefore causes the pin 104 to slide in the groove or guideway 118 and shift the lens unit 92 forwardly and rearwardly in the viewfinder barrel 90. Further, according to the inclination or helix angle of the helical groove 118, the lens mounting tube 117, and hence the diverging lens unit 92 moves at a predetermined linear rate for a given linear rate of drive ring rotation, and is located longitudinally of the barrel shell 95 in correspondence with the angular disposition of the drive ring and pin.

The bracket 12 fixedly secures the accessory zoom lens 10 and viewfinder 11 in laterally spaced apart relation, and rotatably supports a pinion or spur gear 133 in meshing engagement with both the drive gears 47 and 103 of the accessory lens and viewfinder, respectively. More specifically, as seen in Fig. 4, the pinion 133 is journaled in the intermediate portion of the bracket 12 for rotation about an axis extending longitudinally of the zoom lens and viewfinder. A disc or button 134 holds the pinion 133 on the bracket 12. Through the pinion 133, the drive ring 47 and lens units 17 and 18 of the zoom lens are operatively connected to the drive ring 103 and viewfinder lens unit 92 for movement in predetermined relation with respect to each other. Further, movement of the movable lens units of both the zoom lens and viewfinder is effected by actuation of the lever 13.

In the schematic ray diagrams of Figs. 6, 7 and 8, the upper diagram of each figure corresponds to the optical system of the zoom lens 10, while the lower diagram of each figure corresponds to the optical system of the viewfinder 11. Fig. 6 illustrates the optical systems in their extreme wide angle position of minimum effective focal length and fractional image magnification or reduction, wherein the drive gears 47 and 103 have been rotated to their limiting counter clockwise position to shift forward both the intermediate diverging zoom lens unit 18 and the intermediate diverging viewfinder lens unit 92. The rear converging lens unit 17 of the zoom lens is also in a forward position.

In the normal position of zero magnification, i.e., no change in image size over that produced by the objective lens, the lens units of the zoom lens and viewfinder are in substantially the positions shown in Figs. 2, 4, and 7. The intermediate diverging lens units 17 and 92 are approximately midway of their axial travel, and the rear converging lens unit 17 of the zoom lens system is at its rearmost position.

In Fig. 8, the telephoto condition of maximum effective focal length and image magnification, is illustrated, wherein both the drive gears 47 and 103 have been rotated to their limiting clockwise position, as seen in Fig. 5, to shift the intermediate zoom lens unit 18 and intermediate viewfinder lens unit 92 to their rearmost positions. The rear converging lens unit 17 of the zoom lens system is simultaneously shifted forwards into close proximity to the diverging lens unit 18.

As the diverging lens 82 of the zoom effect lens system is of greater strength or power than either the front converging lens 67 or the rear converging lens 73, the diverging lens combines with the converging lenses individually to define negative compound front and rear lenses. That is, in the wide angle condition of Fig. 6, the diverging lens 82 and converging lens 67 combine to define a negative compound front lens, and in the telephoto condition of Fig. 8, the diverging lens 82 and converging rear lens 73 combine to define a negative compound rear lens.

In the wide angle condition, the rear converging lens 73 is of such power and so spaced from the negative compound front lens as to cooperate with the latter to form an erect, diminished virtual image. The diverging lens 82 combines with the rear converging lens 73 in the telephoto condition of Fig. 8 to define a negative, compound rear lens which is so spaced from the converging front lens 67 as to cooperate with the latter to form an erect, enlarged virtual image. In the condition of Fig. 7, the movable lenses 73 and 82 are so spaced relative to each other and the fixed lens 67 as to neutralize each other and define an erect image of unit magnification. As movement of the lenses 73 and 82 between the wide angle and telephoto conditions is gradual and continuous, a virtual, erect image of continually changing size will be formed.

In order to insure afocal magnification by the zoom lens system, wherein parallel rays entering through the front converging lens 67 emerge in parallelism from the rear converging lens 73, the latter lens is constrained by the configuration of the cam slot 32 to movement such that it is always spaced by its focal length from the image formed by the diverging lens 82. For purposes of explanation it may be assumed that movement of the rear converging lens 73 plays no part in changing the magnification of the system, but only maintains the system afocal. By this explanation, change in magnification is dependent only upon movement of the diverging lens 82 relative to the converging front lens 67.

As magnification varies directly with the distance between the diverging lens 82 and converging lens 67, and as the cam slot 33 is substantially a true helix, it follows that change in magnification is substantially linear or varies directly with rotation of the drive gear 47.

By way of example, and without intent to be limited thereto, lenses of the following characteristics have been satisfactorily employed in the instant device:

|  | Focal length |
|---|---|
| Front converging lens 67 | 66.7 |
| Intermediate diverging lens 82 | 21.5 |
| Rear converging lens 73 | 66.7 |

Of course, a great variety of other lens combinations may be employed. For each such combination it will be necessary to calculate and plot the curvature of the cam slot 32 necessary to constrain the rear converging lens to a position at a distance from the image formed by the diverging lens 82 equal to the focal length of the rear converging lens.

In practice a fully corrected and relatively inexpensive zoom effect lens system of the present invention has been produced by forming each of the front converging lens 67 and the diverging lens 82 of two cemented lens elements, and forming the rear converging lens 73 of a single element.

In order to focus the zoom effect lens system for objects at different distances, it is only necessary to rotate the focusing tube 36 relative to the barrel shell 22 to place the desired graduation of scale 44, see Fig. 1, in alignment with a marking on the barrel shell portion 24. This, of course, changes the spacing between the front converging lens 67 and diverging lens 82 for all positions of the latter lens. Initial setting of the focus scale 44 may be made by adjusting the lens mounting ring 65 in the focusing tube 36 to properly focus an object at infinity, and then rotating the scale 44 relative to the focusing tube 36 to properly place the infinity marking. This is all done with the stop pin 41 in abutting engagement with the shoulder 24, as seen in Fig. 2. The set screws 66 and 45 may then be tightened, and the focusing tube 36 set for any desired object distance.

Of course, the abovementioned magnification and demagnification in effect changes the focal length of the camera objective. Therefore, it is preferred to graduate the drive ring 47 in effective focal lengths, see Fig. 1, so that the effective focal length may be determined for any position of the drive ring.

As the instant zoom lens system is preferably afocal, it follows that the system may be employed with any camera objective.

The schematic ray diagrams of Figs. 6, 7 and 8 also illustrate the wide angle, neutralized and telephoto conditions, respectively, of the viewfinder 11. In essence, the viewfinder lens system operates in a manner similar to that of the zoom effect lens system, the diverging lens 122 combining with the front converging lens 113 to define a negative compound front lens in the wide angle condition, and combining with the eyepiece lenses 128 and 129 to define a negative compound rear lens in the telephoto condition. However, for simplicity of construction, the eyepiece lenses 128 and 129 are fixed in the viewfinder barrel 90, while only the diverging lens 122 is axially movable. Hence, the viewfinder lens system cannot be afocal for all positions of diverging lens movement, but this is not essential as the operator's eye can accommodate.

In the embodiment of Figs. 9 and 11, a zoom effect accessory lens, generally designated 10', is arranged longitudinally along side of a viewfinder, generally designated 11' and fixedly secured to the latter by a transversely extending bracket 13'.

The zoom lens 10' is substantially the same as the hereinbefore described zoom lens 10, with the exception of a drive ring or gear 47', which corresponds to the drive gear 47. The drive gear 47' is also of the spur type but is provided with a rearwardly facing peripheral shoulder, lip or ridge 150 which projects radially outwards beyond the teeth of the spur gear 47' and has its forward side beveled or chamfered, as at 151.

The viewfinder drive ring or gear 103' corresponding to the hereinbefore described gear 103, is of similar construction to the gear 47', and formed with a rearwardly facing, forwardly beveled, peripheral lip or shoulder 153 projecting radially outwards beyond the teeth of the gear (not shown in the drawings).

The bracket 13', which corresponds to the bracket 13 of the first described form of the invention, differs from the latter by the provision of a forwardly projecting peripheral skirt 155 which defines in the bracket 13' a forwardly opening recess for receiving the gears 47' and 103', and the intermediate gear 133'. As shown in section in Fig. 9, the forward edge of the bracket skirt 155 engages with the rearwardly facing gear shoulder 150 to enclose and protect the teeth of the gear 47'. The forward edge of the skirt 55 is also engaged by the rearwardly facing shoulder 153 of the viewfinder gear 103' to enclose and protect the teeth of the latter gear; and, a cover plate 157 is fixedly secured, as by fasteners 158, in abutting engagement with the forward edge portions of bracket skirt 155 between the zoom lens and viewfinder to enclose and protect the intermediate gear 133'. That is, the cover plate 157 combines with the intermediate portion of the bracket 13' and engages with the forward, beveled sides of the gear shoulders 150 and 153 to enclose the intermediate gear 133', while the bracket shirt portions extending about the zoom lens and viewfinder engage with the adjacent rearward surfaces of the 150 and, by this construction, the drive gears 47' and 103', are completely enclosed and protected from foreign matter by the bracket 13', cover plate 157 and gear shoulders 150 and 153.

For convenience in operation, the disc or button 134' which corresponds to the disc 134, is fixed to the gear 133' for rotation therewith, and provided with markings as in Fig. 10 readily observable by the operator. As appears, the disc or indicator button 134' is marked off in three sectors or zones 160, 161 and 162; and, cooperating markings are provided on the rear surface of the bracket 13' (not shown). The disc sectors 160, 161 and 162 may be marked in different colors, or by printing, or both, to indicate when the lens system is in the wide angle, normal or telephoto zone or condition, and the approximate degree of the particular condition.

As noted hereinbefore, the mask 114 of the viewfinder 11 is laterally offset to compensate for parallax. In Fig. 11 it will be observed that the mask 114' of the viewfinder 11' is also offset to compensate for parallax; and further, the mask 114' is provided with a notch or slot 165 in one laterally extending edge of the mask opening, to compensate for the increased parallax at the very short focusing distances permitted by the stop arrangement of the focusing tube described hereinbefore. It is preferred that the notch 165 be covered by a transparent, colored sheet so as to be easily distinguished from the picture being taken.

The present invention also contemplates the provision of a novel adaptor ring 168 which has an exteriorly threaded inner portion 169 threadedly engageable in and removable from the internally threaded barrel portion 39. The adaptor ring 168 is formed with an internal, angular shoulder 170 adjacent to and spaced from the rearward end of the ring, and has its forward portion 171 circumferentially enlarged and provided with internal screw threads 172 of substantially the same size as the internal screw threads of the barrel portion 39. A filter 173 is adapted to be releasably clamped in the barrel 15 by the internal adaptor ring shoulder 170; and, the second filter 174 is adapted to be releasably clamped in the adaptor ring 168 between the internal shoulder and a retaining ring 175 threadedly engaged in the forward adaptor ring portion. Of course, either one or both filters 173 and 174 may be omitted if desired. Further, a sunshade (not shown) may be substituted for the filter 174 and retaining ring 175 and removably threaded in the forward adaptor ring portion 171. The adaptor ring 178 thus permits the optional employment of one filter, two filters, or one filter and a sunshade. In addition, the filter retaining ring 175 may be engaged in the barrel portion 39 for holding a filter in the latter, if desired.

From the foregoing, it is seen that the present invention provides a zoom effect accessory lens which fully accomplishes its intended objects and is well adapted to meet practical conditions of manufacture and use.

Although the present invention has been described in some detail by way of illustration and example for purposes of clarity and understanding, it is understood that certain changes and modifications may be made within the spirit of the invention and scope of the appended claims.

What is claimed is:
1. In a lens system for a camera, the combination comprising a tubular outer shell formed with at least one longitudinally extending internal guideway, a tubular inner liner rotatably supported in said outer shell and shaped to define a pair of cam surfaces, a pair of lens mounts slidably in said liner, a lug on each of said lens mounts each engaging one of said cam surfaces and received in a guideway of said shell, said lugs serving to constrain said lens mounts to movement longitudinally of said shell in a relation determined by said cam surfaces when said liner is rotated in said shell, and a group of spaced slide bars extending from each of said lens mounts toward the other of said lens mounts and slidably engaging said liner to prevent canting of said lens mounts in said liner, the slide bars of one group being offset out of alignment with the slide bars of the other group, each of said lens mounts being formed with a plurality of spaced openings in respective alignment with the slide bars of the other lens mount to receive the latter when said mounts are slid toward each other.

2. In a zoom effect accessory lens system for a camera, a barrel adapted for attachment to said camera, a front converging lens axially mounted forward in said barrel, a rear converging lens axially mounted rearward in said barrel and of approximately the same power as said front converging lens, a diverging lens axially mounted in said barrel between said front and rear converging lens, said diverging lens being of a power approximately three times and less than four times that of either of said front and rear converging lenses, a first mounting ring slidable in said barrel longitudinally thereof and carrying said diverging lens, said ring being formed in its periphery with a plurality of spaced notches, a first group of spaced slide bars extending from said first ring toward said rear converging lens and slidably engageable with said barrel to prevent canting of said first ring in said barrel, a second mounting ring slidable in said barrel longitudinally thereof and carrying said rear converging lens, said second ring being formed in its periphery with a plurality of spaced notches in respective alignment with the slide bars of said first group to receive the latter when said rings are slid toward each other, a second group of spaced slide bars extending from said second ring toward said first ring and slidably engaging said barrel to prevent canting of said second ring, the slide bars of said second group being arranged in respective alignment with the notches of said first ring for entering into the latter when said rings are slid toward each other, and cam means constraining said first and second mounting rings to movement in predetermined relation with respect to each other.

3. In a lens system for a camera, the combination comprising a tubular outer shell, a tubular inner liner rotatably supported within said outer shell, one of said shell and liner being shaped to define a cam surface, a lens mount slidable in said liner longitudinally of said shell and liner, follower means on said lens mount and engaging said cam surface to shift said lens mount longitudinally of said shell and liner upon rotation of the latter with respect to said shell, a plurality of spaced tongues projecting from said lens mount longitudinally of and slidably engaging the interior of said liner, said tongues serving to prevent canting of said lens mount in said liner, and a second lens mount slidable in said liner longitudinally of said shell and liner, said second lens mount being formed with a plurality of circumferentially spaced openings arranged to receive the tongues of said first named lens mount when said first and second lens mounts are moved toward each other, so that movement of said lens mounts toward each other is not obstructed by said tongues.

References Cited in the file of this patent

UNITED STATES PATENTS

| | | |
|---|---|---|
| 1,819,844 | Ross | Aug. 18, 1931 |
| 1,988,390 | Naumann | Jan. 15, 1935 |
| 2,165,341 | Capstaff et al. | July 11, 1939 |
| 2,179,850 | Glancy | Nov. 14, 1939 |
| 2,193,016 | Wood | Mar. 12, 1940 |
| 2,377,821 | Sperry et al. | June 5, 1945 |
| 2,419,706 | Contner | Apr. 29, 1947 |
| 2,454,686 | Back | Nov. 23, 1948 |
| 2,529,944 | Houck | Nov. 14, 1950 |
| 2,566,485 | Cuvillier | Sept. 4, 1951 |
| 2,718,817 | Back et al. | Sept. 27, 1955 |
| 2,720,817 | Mills | Oct. 18, 1955 |
| 2,732,763 | Back et al. | Jan. 31, 1956 |

FOREIGN PATENTS

| | | |
|---|---|---|
| 289,886 | Great Britain | Dec. 20, 1928 |

OTHER REFERENCES

American Cinematographer, September 1953, page 435.
Progress in Photography, 1951–1954, pages 34–37 and 41, publisher Focal Press Limited, London and New York.